Sept. 13, 1966     R. D. GLIDDEN ETAL     3,271,865
SURVEYOR'S TARGET
Filed July 2, 1964
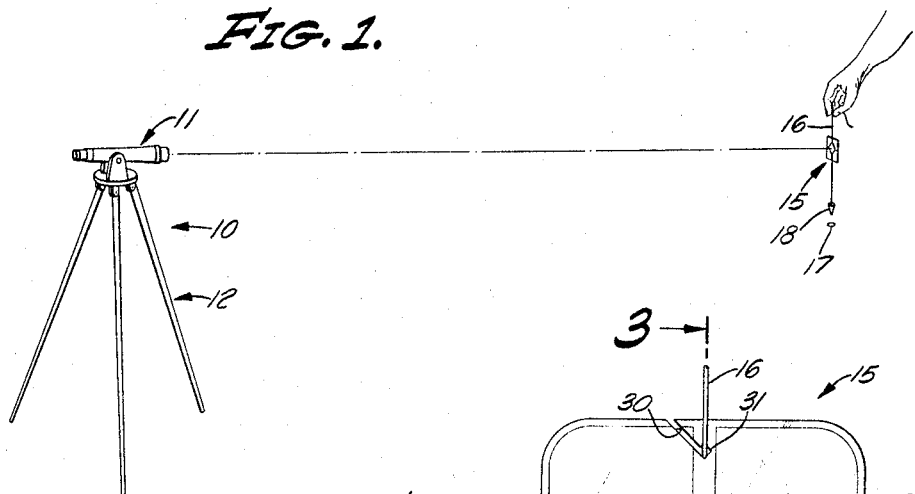
FIG. 1.
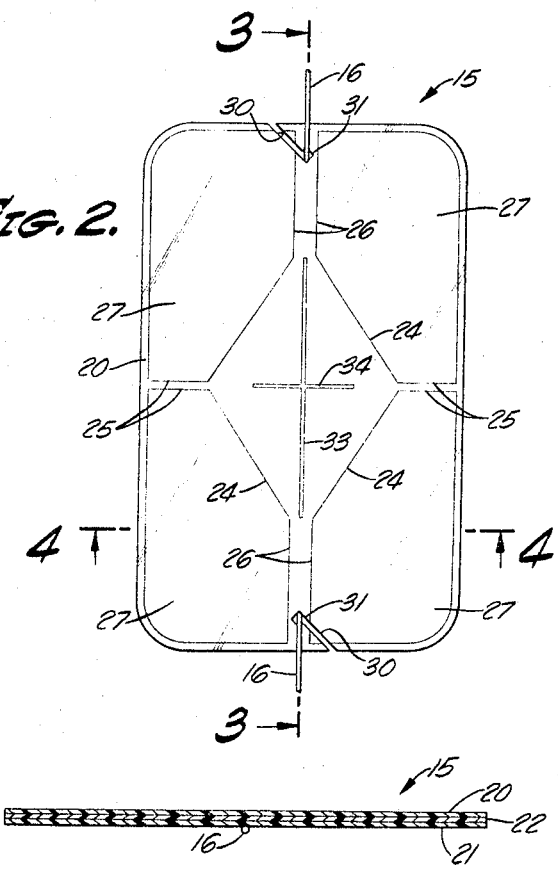
FIG. 2.
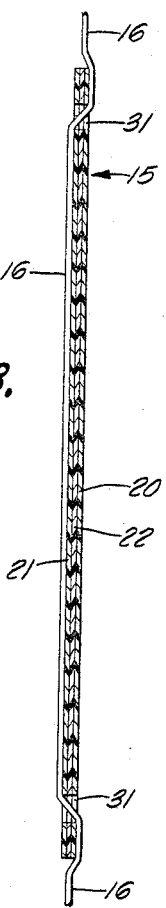
FIG. 3.
FIG. 4.
ROGER D. GLIDDEN
CHARLES E. GLIDDEN
INVENTORS.
BY 
ATTORNEY

United States Patent Office 3,271,865
Patented Sept. 13, 1966

3,271,865
SURVEYOR'S TARGET
Roger D. Glidden, 708 Bettyhill Ave., Duarte, Calif., and Charles E. Glidden, 1231 Lyman Ave., Glendora, Calif.
Filed July 2, 1964, Ser. No. 379,945
5 Claims. (Cl. 33—74)

This application relates to surveying equipment and more particularly to an improved, inexpensive, high visibility surveyor's target adapted to be adjustably supported on a plumb line and readily visible by an instrument man from a remote location.

The typical situation in which there is need for this invention arises when determining a line of sight between two points on the terrain. The distant point is usually definitely marked on the ground by a fixed monument and the instrument man desires to obtain a line of sight through his instrument intersecting a vertical line falling through the center point of the distant marker. This is accomplished according to the present invention by use of a simple, inexpensive, lightweight target so constructed and arranged that it is easily supported on a plumb line while the latter is held suspended directly above the distant marker. The invention target is characterized by being formed from lightweight planar material having a distinctly identified central area in close association with a surrounding contrasting area. Typically and by preference, the central target area proper is formed of transparent-fluorescent material illuminated from its rear by daylight and surrounded by a sharp-lined border area of contrasting opaque material. To insure protection, this target plaque is preferably formed of laminated sheet material and is provided with simple mounting means for securing the target at any point along a plumb line. Desirably, the central area has four corners merging with outlying narrow bands of transparent-fluorescent material coinciding with the vertical and horizontal center lines of the target. Additionally, the central area is preferably further identified and characterized by a pair of opaque narrow bands lying at right angles to one another and aligned with the vertical and horizontal center lines of the plaque to facilitate laying of the instrument crosshairs thereon of the target.

Accordingly, it is a primary object of the present invention to provide an improved sighting target for use by surveyors and designed for suspension on a plumb line or the like so as to leave both faces of the target exposed to daylight.

Another object of the invention is the provision of an improved surveyor's target formed of lightweight laminated material having sharply contrasting opaque and transparent-fluorescent areas cooperating to facilitate alignment of the crosshairs of a sighting instrument thereon.

Another object of the invention is the provision of a surveyor's target formed of laminated material and having areas of contrasting colors imprinted on surfaces sandwiched between the outer faces of the target and sealed from the atmosphere.

Another object of the invention is the provision of a lightweight, high visibility surveyor's target having simple expedients for mounting the same adjustably at different positions along a plumb line.

Another object of the invention is the provision of a laminated sealed surveyor's target having a translucent central target area adapted to be activated by rear lighting as its front face is viewed from a distant sighting instrument.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view showing a typical mode of utilizing the invention target;

FIGURE 2 is an enlarged front elevation view of the target per se; and

FIGURES 3 and 4 are cross-sectional views taken along lines 3—3 and 4—4, respectively, on FIGURE 2.

Referring initially to FIGURE 1, there is shown a typical surveyor's sighting assembly 10 comprising a sighting instrument 11 proper supported on a tripod 12 and set up directly over a first marker. The sighting instrument is here shown as trained on the invention target designated generally 15 as this target is held suspended on a plumb line over monument 17. Plumb line 16 includes a conical plumb bob 18 aiding the target man in holding the plumb line directly over the center of the monument.

Referring now more particularly to FIGURES 2, 3 and 4, there is shown one preferred embodiment of target 15. This target includes three layers of plastic material including identical outer layers 20, 21 sandwiched about a translucent intermediate layer 22. These three main sheets preferably of identical size are suitably sealed together as by well known laminating technique utilizing suitable bonding agents between their adjacent surfaces. Accordingly, it will be understood that the finished target plaque is fluid-tight and moistureproof. If desirable, a sealing agent may be applied about the perimeter edges of the laminate.

Before these three constituent sheets are bonded together, there is applied to one surface of translucent sheet 22 one and preferably two coats of a fluorescent-transparent dye, as arc yellow or the like, having high visibility at long range, particularly when illuminated from the rear as by daylight. This dye is applied over a suitable area, such as the diamond-shaped pattern indicated by lines 24 in FIGURE 2, and preferably includes a narrow horizontal band 25 along the horizontal bisector of the plaque and a similar narrow band 26 along the vertical bisector of the plaque. These bands bisect the horizontal and vertical pairs of corners of target area 24.

The underside of upper cover sheet 20 is also coated with an opaque layer, preferably black, in the areas 27 thereof outwardly of the main target area 24. If desired, a coating of suitable transparent sealing agent is applied over both the dye and the coating covering areas 24, 25, 26 and 27 to aid in holding them in place. Once the surfaces have been coated in the manner described, the three sheets 20, 21 and 22 are in readiness to be laminated together in known manner utilizing heat and pressure and intervening layers of suitable transparent adhesive material.

A remaining operation concerns provision of suitable means for holding the plaque adjustably assembled to a plumb line. Such mounting means may take various forms, but a simple and highly effective means is that shown in FIGURE 2 comprising keyhole slots 30, 30 opening through the upper and lower edges of the target and preferably arranged at an angle to the vertical with their inner enlarged ends 31 lying directly on the vertical bisector of the target. These slots preferably have a width corresponding generally with or slightly less than the diameter of the plumb line with the result that the latter can be inserted through the notch and readily held in place in their inner ends 31 in the manner clearly indicated in FIGURE 2. Desirably, line 16 is installed as illustrated in FIGURE 3 so that the portion of the line between notches 30, 30 is disposed directly behind the vertical center line of the target plaque. So long as the plumb line is held taut by bob 18, the target is firmly anchored in any desired vertically adjusted position. However, should it be desired to move the target up or down along the line, this is easily accomplished by relaxing the tension on the line and sliding it to any desired position.

It should also be pointed out that it is desirable, particularly when working at close range, to provide the central area of the target with a pair of narrow opaque lines 33, 34 lying along the vertical and horizontal bisectors of the target. These are useful under closer range conditions in training the crosshairs of the sighting instrument to coincide exactly with lines 33 and 34.

The use of the described target will be readily apparent from the foregoing description of its construction. When the target is not lighted from the rear, the central area has a rather deep orange hue that appears quite as dense as the opaque black border surrounding the central area. However, when the target is held upright and viewed directly from the front, daylight illuminates the rear side and the central target area 24 has the appearance of being highly illuminated and is quite transparent. Accordingly, this area contrasts sharply with opaque areas 27 and its outline is sharply delineated and visible over long distances from the sighting instrument 11. Accordingly, the time required to give or take a line of sight over a distant monument is greatly minimized.

While the particular surveyor's target herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A surveyor's target for use on a plumb line, said target comprising a plaque of stiff plastic material, said plaque being divided into opaque areas and other areas of transparent-fluorescent material so arranged relative to said opaque areas as to facilitate alignment of the crosshairs of a sighting instrument thereon with the vertical cross hair coincident with a plumb line, said plaque being substantially transparent throughout the thickness of said transparent-fluorescent areas whereby the latter are activated in the daytime by the light rearward thereof, and said transparent-fluorescent area lying generally centrally of said plaque and including two pairs of corners aligned, respectively, with the vertical and horizontal center lines of said plaque.

2. A target as defined in claim 1 characterized in that said transparent-fluorescent areas include narrow bands of transparent-fluorescent material extending at right angles to one another from said four corners and bisected by said vertical and horizontal center lines.

3. A target as defined in claim 2 characterized in that the central area of said plaque includes narrow bands of opaque material lying at angles to one another and bisected respectively by the horizontal and vertical center lines of said plaque.

4. A target as defined in claim 1 characterized in that said plaque is formed of thin sheets of thin rigid plastic material bonded together.

5. A target as defined in claim 1 characterized in that said transparent-fluorescent and opaque areas are laminated between a pair of transparent plastic sheets.

References Cited by the Examiner
UNITED STATES PATENTS

| | | | |
|---|---|---|---|
| 1,227,631 | 5/1917 | Kolesch | 33—74 |
| 1,346,360 | 7/1920 | White | 33—74 X |
| 1,500,482 | 7/1924 | Barrett | 33—74 |
| 1,778,323 | 10/1930 | James | 33—74 |
| 2,579,644 | 12/1951 | Bergman | 33—74 |
| 2,663,937 | 12/1953 | Fatkin | 33—74 |

LOUIS R. PRINCE, *Primary Examiner.*

D. McGIEHAN, *Assistant Examiner.*